United States Patent [19]

Graham et al.

[11] 4,250,226

[45] Feb. 10, 1981

[54] METHOD FOR PRODUCING AN ADHESIVE-COATED HIGH-STRENGTH STEEL REINFORCING MEMBER

[75] Inventors: Thomas E. Graham, Raleigh, N.C.; George H. Thaxton, Charleston, S.C.; Francis M. Mitchell, Chapel Hill; Robert P. Bell, Cary, both of N.C.

[73] Assignee: Monsanto Company, St. Louis, Mo.

[21] Appl. No.: 746,768

[22] Filed: Dec. 2, 1976

Related U.S. Application Data

[62] Division of Ser. No. 598,591, Jul. 3, 1975, Pat. No. 3,998,993.

[51] Int. Cl.³ .................. B32B 15/18; D02G 3/36; D02G 3/40; D02G 3/48
[52] U.S. Cl. .................................. 428/344; 57/258; 148/12.4; 148/143; 156/110 A; 156/110 C; 427/318; 427/388.1; 428/373; 428/378; 428/379; 428/385; 428/390; 428/397
[58] Field of Search ............ 148/12.4, 14, 143; 156/110 A, 110 C; 427/207 R, 207 A, 207 B, 208, 318, 388 R, 388 A, 388 B, 388 C; 428/378, 385, 390, 212, 214, 344, 373, 379, 397; 57/231, 234, 242, 251, 258

[56] References Cited

U.S. PATENT DOCUMENTS

| | | | |
|---|---|---|---|
| 2,061,352 | 11/1936 | Dillon | 427/318 X |
| 3,423,230 | 1/1969 | Georges | 156/110 A |
| 3,669,738 | 6/1972 | Cottis et al. | 427/138 X |
| 3,761,303 | 9/1973 | Cox et al. | 427/318 |
| 3,817,778 | 6/1974 | Wright | 428/375 X |
| 3,953,250 | 4/1976 | Golland | 148/36 |
| 4,017,338 | 4/1977 | Kozak et al. | 148/12 B |

Primary Examiner—Bruce H. Hess
Attorney, Agent, or Firm—James W. Williams, Jr.; Donald J. Fitzpatrick; John D. Upham

[57] ABSTRACT

Steel ribbons and wires having quenched martensite or bainite microstructure are disclosed having an organic adhesive coating which is degraded at the steel-adhesive interface. The products are useful as steel tire reinforcements.

5 Claims, No Drawings

METHOD FOR PRODUCING AN ADHESIVE-COATED HIGH-STRENGTH STEEL REINFORCING MEMBER

This is a division, of application Ser. No. 598,591, filed July 3, 1975, now U. S. Pat. No. 4,029,832 issued on June 14, 1977.

BACKGROUND OF THE INVENTION

1. Field of the Invention

This invention relates to reinforcing members suitable for use in rubber composite structures and more particularly to a heat treated steel reinforcing member containing an adhesive coating on the surface thereof.

2. Description of the Prior Art

Steel in the form monofilaments, viz ribbon or wire and strands or cords, are used for reinforcing rubber articles. It is well known that such reinforcing members exhibit certain mechanical properties, namely tensile strength and ductility, in order to be considered acceptable reinforcing components. Such properties can be attained by using a steel containing approximately 0.70% carbon. The combination of mechanical work imposed on the steel during fabrication and chemical analysis produces the desired properties in these steels.

Another technique for attaining comparable properties is to heat treat a steel alloy containing a lesser amount of carbon, for instance properly heat treating a steel containing about 0.50% carbon will yield a product having an ultimate tensile strength comparable to hard-drawn steel of 0.70% carbon.

In copending patent application Ser. No. 519,364, filed Oct. 30, 1974 by D. I. Golland, et. al., now U.S. Pat. No. 3,953,250, issued on Apr. 27, 1976, there is disclosed a method for producing a steel reinforcing member in the form of a monofilament. In another commonly assigned copending patent application Ser. No. 229,515, filed on Feb. 25, 1972 by M. R. Sargent et. al. there is disclosed a steel reinforcing member in the form of a twisted strand or cord. In order to attain the required properties in both the monofilament and the cord or strand construction these components must be heat treated. Such a heat treatment consists of austenitizing the steel member, quenching the steel member and thereafter tempering the steel member.

After the desired mechanical properties are obtained the monofilament or cord is coated with an adhesive in order for the reinforcing member to be used in the construction of a rubber composite. To insure satisfactory adhesion of the coating to the steel member a clean, uncontaminated steel surface is essential. Surface contamination can occur in several ways. For example, if oil is used as the quench media the heated steel member upon entering the quench can cause the quench to vaporize and result in a rather tenacious deposit of decomposed oil on the steel surface. Furthermore, oil is frequently applied to prevent rusting of the steel prior to the application of the adhesive coating and mill dirt naturally accumulates during routine handling of the steel as it is processed further contaminating the steel surface.

To achieve acceptable bonding of the adhesive to the steel surface the heretofore contamination had to be removed. Such contamination is generally removed by a complex and expensive cleaning cycle comprising alkali washing and a series of water and acid rinses. After cleaning the steel is then in a condition to receive the adhesive coating. Such a coating was applied by passing the steel member through an aqueous adhesive mixture. The coated product was then heated in order to dry and cure the applied adhesive.

SUMMARY OF THE INVENTION

The present invention provides a method for producing an adhesive coated, high-strength steel wherein an intermediate step of cleaning prior to application of the adhesive coating is eliminated.

The present invention further provides a method wherein the quenching media is an adhesive bath. The quenched steel containing the adhesive coating is thereafter in a continuous sequential manner reheated so as to dry and cure the adhesive coating and temper the steel.

The present invention produces an adhesive-coated, high-strength steel reinforcing member by austenitizing a steel monofilament or strand, passing the steel member while still in the austenitic state through an organic adhesive coating bath wherein a uniform continuous adhesive coating is applied and at a rate sufficient to form a quenched structure of martensite, bainite or mixtures thereof and thereafter heating the steel member so as to effect drying curing and tempering.

It is, therefore, an object of this invention to provide a method wherein a steel reinforcing member can be quenched directly from austenite to a quenched structure of martensite, bainite or mixtures thereof in an organic adhesive coating bath.

A further object of this invention is to provide a method wherein drying, curing and tempering occur in a continuous sequential manner.

A still further object of this invention is to provide a method for producing an adhesive coated product wherein intermediate cleaning is eliminated.

A further object of this invention is to provide a method for producing a heat-treated monofilament steel reinforcing member containing an adhesive coating.

Another object of this invention is to provide a method for producing a heat-treated steel cord reinforcing member having an adhesive coating.

Still another object of this invention is to provide a coated steel reinforcing member having a continuous organic adhesive coating on the surface thereof.

DETAILED DESCRIPTION OF THE PREFERRED EMBODIMENT

In conducting the process of this invention steel in two forms may be employed as the starting material. Rectangular steel stock, and a plurality of steel filaments, twisted together to form a cord or strand, may be used in practicing this invention. A typical cord construction used as a reinforcing member is a strand consisting of five filaments of 0.025 cm diameter twisted in one direction and commonly referred to as 1×5 cord or strand. Furthermore rectangular stock having an aspect ratio less than about 25 wherein this ratio is defined as stock width (w)/stock thickness (t) can be used as a reinforcing member for penumatic tires. Regardless of the geometric configuration of the steel stock employed the process described herein is the same for both forms. Unless otherwise specified the term "steel reinforcing member" shall mean both a monofilament, such as rectangular and circular steel stock, and a plurality of filaments such as a cord or strand. Such filaments are generally circular but square, rectangular or shaped cross-sections may also be utilized.

In practicing this invention steel is provided in the appropriate form in compositions generally falling within the chemical composition limits defined by the grade numbers AISI 1030 to AISI 1095. Carbon is the primary alloy constituent and therefore the carbon content should broadly be in the range from about 0.30% to about 1.00% and within the preferred range of about 0.50% to about 0.70% for certain applications such as reinforcing members for penumatic tires. Carbon is maintained within this range in order to insure tht the alloy has an adequate response during heat treatment so as to attain certain mechanical properties as will hereinafter be more fully discussed.

The steel reinforcing member is heat treated in order to impart satisfactory mechanical properties. The steel is continuously passed into a muffle furnace at a predetermined speed containing a protective or inert atmosphere and austenitized. Heat can be applied to the steel in any manner well known in the art. For example, the steel can pass through a molten lead bath or can be heated by electric resistance. Further modes of heating include a fluidized bed, and radient tubes heated electrically or by hot gases. In the embodiment described herein a muffle furnace is electrically heated. Steel in the form of a ribbon, e.g, 10 mils (0.025 cm) thick $\times$ 40 mils (0.0102 cm) wide can be austenitized at approximately 760° C. with a line speed of about 43 mpm. Steel in the form of cord, e.g., $1 \times 5 \times 0.025$ cm can be austenitized at approximately 820° C. with a line speed of about 61 mpm. During austenitization there is also some amount of homogenization occurring.

After austenitization the steel reinforcing member is immediately quenched in an aqueous adhesive mixture whereupon a uniform, continuous adhesive coating is applied and austenite transforms into a quenched structure of martensite, bainite and/or mixtures thereof. The resulting transformation products are dependent upon the quench rate. By substituting this quench media for the quench media formerly employed, namely, oil or water, the advantage of this invention becomes readily apparent. Cleaning the quenched steel surface by a washing cycle comprising cleaning agents and rinses in order to insure removal of all surface contamination has been eliminated. By employing the method of this invention there is simply no surface contamination prior to the application of the adhesive.

The quenched and coated steel reinforcing member is then continuously reheated to a lower temperature. Reheating in the temperature range of 100°-300° C. accomplishes the following: (a) the adhesive coating is dried; (b) the adhesive coating is cured; and (c) the brittle quenched steel microstructure is tempered.

Drying and curing the adhesive coating is important for a variety of reasons. To avoid premature failure of the rubber composite in service the steel reinforcing member must satisfactorily bond to the rubber. A satisfactory bond between the adhesive and the rubber can only be achieved with a coating that is essentially free of blisters and other surfaces imperfections. Drying insures an essentially uniform, defect-free continuous adhesive coating. To determine adhesion characteristics, the coated steel reinforcing member is subjected to stringent adhesion tests as hereinafter more fully discussed. A properly cured coating can only pass these adhesion tests.

During quenching austenite can transform into a brittle microconstituent and to remove such brittleness the quenched steel member would thereafter be continuously tempered. Tempering restores ductility, removes stresses imparted by quenching and renders the steel easier to handle.

For the practice of this invention an organic rubber based adhesive system is employed. There are many such systems well known in the art for bonding reinforcing members to rubber. Some organic adhesive systems include solutions of polymers and dispersed solid compounds in organic solvents. Epoxy resins and monomeric unsaturated silanes are other known adhesives. Another satisfactory organic adhesive system in the RFL system. This system is described in U.S. Pat. Nos. 3,817,778 and 3,835,082 wherein it is disclosed that the adhesive comprises resorcinal formaldehyde condensation products and a butadine-styrene-vinylpyridine latex. These two patents disclose that certain constituents in the RFL system can be modified to secure improved adhesion.

After a steel reinforcing member with the requisite composition is provided, certain parameters control the steps of austenitizing, quenching and reheating. In the austenitization step, the austenitization temperature, the temperature to which the steel is heated, and residence time, that is, the period of time that the steel reinforcing member is maintained at this temperature, are the key parameters. These parameters affect homogenization and grain size of the finished product. These two characteristics have an influence on the mechanical properties of the finished product.

The quenching step is the critical step of this invention. The rate of quench must be rapid enough to transform all of the austenite to martensite, bainite or mixtures thereof. The steel reinforcing member produced by the method of this invention must exhibit specific mechanical properties, namely an ultimate tensile strength in excess of about 140 kg/mm$^2$. This strength level can only be achieved if there is a complete austenite transformation to a quenched structure. This step is controlled by the make-up of the adhesive quench bath, bath temperature and residence time as used hereinafter "adhesive quench bath" will be referred to as the "dip". These terms, quench bath and dip, can be used interchangeably. The make-up of the dip is expressed by reference to the concentration of solids in the adhesive dip and is shown by percent by weight. By lowering the concentration of solids in the dip, that is down to 5% by weight a faster quench rate can be attained. On the other hand if the concentration of solids rises to 20% by weight the quench rate is slowed accordingly. For RFL type adhesives, dip temperature is maintained between room temperature (approximately 20° C.) and 30° C. If the temperature of the dip is not maintained within this range mechanical properties and adhesion will be adversely affected. Furthermore, as the dip temperature exceeds about 30° C., for example, the dip can break down and decompose. Residence time in the quench medium likewise affects the austenite transformation. These parameters, dip concentration, dip temperature and residence time must be carefully balanced in order to attain satisfactory mechanical properties in the finished product and a high level of adhesion. Agitation of the dip can improve heat transfer and quenching efficiency.

The final step that must be controlled is that of reheating. By judicious reheating, drying and curing of the adhesive coating and tempering of the quenched steel member microstructure can be accomplished in a continuous sequential manner. Such continuous sequential heating is achieved by passing the quenched steel through a series of reheating zones, each maintained at an increasingly higher temperature than the preceding zone. For example, drying can be conducted at the lowest temperature and this can be accomplished in a first zone maintained at about 100° C. After drying, the steel would enter a second zone maintained at a higher temperature, e.g., about 180° wherein the dried adhesive coating would be cured; and then the steel would enter a third zone wherein tempering of the steel structure would be accomplished at about 200° to 240° C. Residence times in each zone are correlated so as to achieve optimum adhesion and mechanical properties. By reheating in such a manner the adhesive coating is properly dried and cured at lower temperatures before exposure to higher tempering temperatures occur. After reheating, the product produced by the method of this invention exhibits excellent mechanical properties. The following properties are considered typical:

Ultimate tensile strength, 240 kg/mm$^2$
Yield strength, 190 kg/mm$^2$
Elongation, 3.0 to 3.5%

The method of this invention produces a novel product. When the steel reinforcing member passes through the dip after austenitization a reaction occurs at the surface of the steel member. The steel, being at an elevated temperature causes some of the components of the dip, namely, water and volatiles to be flashed or vaporized out of the adhesive layer which is immediately adjacent to the steel surface. This initial layer of dip is also immediately dried and cured. This drying and curing occurs at a higher temperature than normal for drying and curing. The combined effect of a portion of the dip flashing or volatilizing away plus over drying and curing is a slightly degraded layer of adhesive at the steel-coating interface. However such degradation does not significantly effect steel-adhesive bonding and adequate adhesion is achieved between the adhesive and the steel. As the steel member continues to pass through the dip the coating thickness increases. The initial degraded layer is then covered by an unimpaired layer resulting in a coating with an outside surface that is continuous and substantially free of any imperfections. Since it is this outside layer that bonds to the rubber during construction of rubber composites the adhesion of this product is not adversely affected by this degraded interface.

The invention can now be understood more clearly be reference to the following examples:

EXAMPLE I (a) Starting material
  1×5×0.025 cm cord, AISI 1050 composition.
(b) Cord was continuously austenitized at 800°–900° C.
(c) Cord was continuously quenched immediately after austenitization in an RFL type organic adhesive containing 5% by weight of solids.
(d) Cord was reheated; initially heated to 100° C. for 60 seconds wherein the adhesive coating was dried and then heated at 180° C. for 120 seconds wherein the coating was cured.
(e) Adhesion property results: H-Block - 21.7 kg Remarks Examination of the samples by a scanning electron microscope revealed excellent distribution of the coating around each filament and dip penetration to the interior of the cord was effected. This example illustrates that satisfactory adhesion can be achieved by the method of this invention.

Standard H-block and strip adhesion tests were performed essentially in the manner described in U.S. Pat. No. 3,817,778.

EXAMPLE II (a) Starting material
  1×5×0.025 cm, AISI C1050 composition
(b) Cord was preheated and then austenitized at 820° C. by continuously passing it through a furnace at 61 mpm. Cord residence time 12.2 seconds.
(c) Cord was continuously equenched immediately after austenitization in an RFL type oganic adhesive containing 5% by weight of solids, maintained at 22° C. Residence time 2.3 seconds.
(d) Cord was reheated to 230° C., residence time 35 seconds.
(e) Property results:
  1. Microstructure, homogeneous tempered martensite and bainite mixture.
  2. Microhardness - 635 kp/mm$^2$
  3. Adhesion: H-block 10 kg; Strip adhesion 1.5
  4. UTS 264 kg/mm$^2$; Elongation 3.5%

Remarks

The mechanical properties achieved in this example are satisfactory. Ultimate tensile strength and microhardness indicate that adequate quenching was provided by the dip. A metallographic examination shows complete transformation to martensite and bainite.

EXAMPLE III (a) Starting material
  1×5×0.025 cm cord, AISI 1050 composition.
(b) Cord was austenitized at 775° C. by continuously passing it through a furnace at 61 mpm. Cord residence time 18.3 seconds.
(c) Cord quenching in the adhesive dip was varied by altering the parameters of solids concentration in the quench bath and residence time. Dip temperature was maintained within the range of room temperature and 30° C. Water cooled coils were used to maintain dip temperature within this range.
(d) The cord was reheated to 220° C. with a residence time of 27 seconds wherein drying, curing and tempering were effected.
(e) Property results:
  1. Microstructure—a homogeneous tempered martensite and bainite mixture.
  2. Microhardness - see accompanying table.
  3. Adhesion and mechanical properties resulting from altering residence time and concentration appear in accompanying table.

|  | Properties | Dip Residence Time (Sec.) | | |
|---|---|---|---|---|
|  |  | 0.4 | 0.5 | 0.8 |
| Dip Concentration (% by Weight of Solids) | 20 | | | |
|  | UTS, kg/mm$^2$ | 266.3 | 263.8 | 257.5 |
|  | % Elongation | 4.8 | 4.8 | 4.2 |
|  | Microhardness, kp/mm$^2$ | 587 | — | — |
|  | H-block, kg | 14.3 | 17.4 | 20.8 |
|  | Strip adhesion | 3.5 | 3.5 | 3.9 |
|  | 15 | | | |
|  | UTS, kg/mm$^2$ | 265.5 | 263.3 | 260.6 |
|  | % Elongation | 4.3 | 4.4 | 4.1 |
|  | Microhardness, kp/mm$^2$ | 610 | 630 | 581 |
|  | H-block, kg | 10.8 | 23.9 | 25.2 |
|  | Strip adhesion | 2.7 | 3.8 | 4.3 |

-continued

| Properties | Dip Residence Time (Sec.) | | |
|---|---|---|---|
| | 0.4 | 0.5 | 0.8 |
| 10 | | | |
| UTS, kg/mm$^2$ | 264.1 | 258 | 257.8 |
| % Elongation | 4.0 | 3.4 | 3.8 |
| Microhardness, kp/mm$^2$ | 625 | — | 610 |
| H-block, kg | 21.8 | 24.0 | 26.6 |
| Strip adhesion | 3.4 | 4.3 | 4.4 |

Remarks

This example illustrates the effect of varying dip concentration and dip residence time on mechanical properties and adhesion.

Percent elongation is effected by dip concentration and residence time. The lower concentrations yield faster quenching rates as shown by the lower elongations for 10% solids as contrasted to 20% solids.

The table also shows that adhesion is effected by dip concentration and residence time. Acceptable levels of adhesion were achieved with lower concentration of solids. As residence time increased adhesion levels as measured by H-blocks and strip adhesion also increased. To achieve satisfactory mechanical properties and adhesion, dip residence time and dip concentration must be balanced through experimentation for the geometry of the steel reinforcing member.

Although the invention has been illustrated by the heretofore examples, it is not limited thereto. Changes and modifications of the examples of the invention can be made which do not constitute a departure from the spirit and scope of the invention.

The invention for which an exclusive property or privilege is claimed are defined as follows:

I claim:

1. A coated steel reinforcing member, comprising:
    a steel substrate having a composition within the limits defined by the grade numbers AISI 1030 to AISI 1095 and a quenched structure of martensite, bainite or mixtures thereof; and
    a continuous organic adhesive coating on the surface of said substrate wherein the interface between said substrate and said coating is characterized by a layer of degraded adhesive.

2. A coated steel reinforcing member as recited in claim 1 wherein said substrate is a monofilament.

3. A coated steel reinforcing member as recited in claim 1 wherein said monofilament is a rectangular ribbon.

4. A coated steel reinforcing member as recited in claim 1 wherein said monofilament has a circular cross-section.

5. A coated steel reinforcing member as recited in claim 1 wherein said member comprises a plurality of filaments stranded together.

* * * * *

UNITED STATES PATENT AND TRADEMARK OFFICE
CERTIFICATE OF CORRECTION

PATENT NO. : 4,250,226

DATED : February 10, 1981

INVENTOR(S) : Thomas E. Graham, George H. Thaxton, Francis M. Mitchell and Robert P. Bell It is certified that error appears in the above—identified patent and that said Letters Patent is hereby corrected as shown below:

Claims 3 and 4 are dependent on Claim 2 and should read as follows:

3. A coated steel reinforcing member as recited in Claim 2 wherein said monofilament is a rectangular ribbon.

4. A coated steel reinforcing member as recited in Claim 2 wherein said monofilament has a circular cross-section.

Signed and Sealed this

Twenty-first Day of April 1981

[SEAL]

Attest:

RENE D. TEGTMEYER

Attesting Officer     Acting Commissioner of Patents and Trademarks